(12) United States Patent
Chia

(10) Patent No.: US 10,786,731 B2
(45) Date of Patent: Sep. 29, 2020

(54) WEARABLE DEVICES, METHODS FOR CONTROLLING A WEARABLE DEVICE, AND COMPUTER-READABLE MEDIA

(71) Applicant: RAZER (ASIA-PACIFIC) PTE. LTD., Singapore (SG)

(72) Inventor: Jun Shen Chia, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 196 days.

(21) Appl. No.: 15/779,037

(22) PCT Filed: Nov. 24, 2015

(86) PCT No.: PCT/SG2015/050467
§ 371 (c)(1),
(2) Date: May 24, 2018

(87) PCT Pub. No.: WO2017/091141
PCT Pub. Date: Jun. 1, 2017

(65) Prior Publication Data
US 2018/0353852 A1    Dec. 13, 2018

(51) Int. Cl.
*A63F 13/26* (2014.01)
*G06F 1/16* (2006.01)
(Continued)

(52) U.S. Cl.
CPC .............. *A63F 13/26* (2014.09); *A63F 13/22* (2014.09); *A63F 13/285* (2014.09); *A63F 13/50* (2014.09); *A63F 13/73* (2014.09); *G06F 1/163* (2013.01); *G06F 3/016* (2013.01); *G06F 3/0484* (2013.01); *G06F 3/04812* (2013.01); *A63F 2300/301* (2013.01); *A63F 2300/302* (2013.01); *G06F 2203/014* (2013.01)

(58) Field of Classification Search
USPC ........................................... 463/30
See application file for complete search history.

(56) References Cited

U.S. PATENT DOCUMENTS 6,135,450 A   10/2000  Huang
8,364,257 B2   1/2013  Van Den Eerenbeemd et al.
(Continued)

FOREIGN PATENT DOCUMENTS

EP      1060772 A2    12/2000
KR    100964477 B1     6/2010
(Continued)

OTHER PUBLICATIONS

International Search Report and Written Opinion, dated Aug. 24, 2016, for the corresponding International Application No. PCT/SG2015/050467 in 8 pages.
(Continued)

*Primary Examiner* — Pierre E Elisca
(74) *Attorney, Agent, or Firm* — Polsinelli PC

(57) ABSTRACT

According to various embodiments, a wearable device may be provided. The wearable device may include: a determination circuit configured to determine data related to a gaming action performed on a computer to which the wearable device is external; and a feedback circuit configured to provide feedback to a user based on the determined data.

20 Claims, 3 Drawing Sheets

(51) Int. Cl.
- *A63F 13/285* (2014.01)
- *G06F 3/0484* (2013.01)
- *G06F 3/0481* (2013.01)
- *A63F 13/73* (2014.01)
- *G06F 3/01* (2006.01)
- *A63F 13/22* (2014.01)
- *A63F 13/50* (2014.01)

(56) References Cited

U.S. PATENT DOCUMENTS

| | | | |
|---|---|---|---|
| 8,708,825 | B2 | 4/2014 | Crisco, III |
| 8,939,835 | B2 | 1/2015 | Tan et al. |
| 2004/0229702 | A1 | 11/2004 | Cooke |
| 2008/0153590 | A1* | 6/2008 | Ombrellaro ............... F41H 1/02 463/30 |
| 2008/0300055 | A1 | 12/2008 | Lutnick et al. |
| 2009/0131165 | A1* | 5/2009 | Buchner ................. A63F 13/52 463/30 |
| 2010/0304864 | A1 | 12/2010 | Johnson et al. |
| 2011/0218043 | A1 | 9/2011 | Quillen, III |
| 2012/0190460 | A1 | 7/2012 | Sessions |
| 2013/0173658 | A1 | 7/2013 | Adelman et al. |
| 2014/0099615 | A1 | 4/2014 | Sweeney et al. |
| 2014/0142459 | A1* | 5/2014 | Jayalth ................. A61B 5/0488 600/547 |
| 2014/0218184 | A1* | 8/2014 | Grant ....................... G08B 6/00 340/407.1 |
| 2014/0243093 | A1 | 8/2014 | Rom et al. |
| 2014/0295926 | A1 | 10/2014 | Zhang |
| 2014/0364204 | A1 | 12/2014 | Törnqvist |
| 2015/0019135 | A1 | 1/2015 | Kacyvenski et al. |
| 2015/0334772 | A1 | 11/2015 | Wong et al. |

FOREIGN PATENT DOCUMENTS

| | | |
|---|---|---|
| TW | 200902128 A | 1/2009 |
| WO | WO 2014/117125 A1 | 7/2014 |

OTHER PUBLICATIONS

"Tt eSports Theron Plus Brings Stats to Gaming Mice" by Karim Lahlou, Hardware, Jun. 30, 2015, retrieved from: http://www.gamecrate.com/tt-esports-theron-plus-brings-stats-gaming-mice/9721 in 12 pages.

"Smart mouse monitors your vitals as you game" by Michelle Star, Cnet on Dec. 4, 2014, retrieved from: http://www.cnet.com/news/smart-mouse-monitors-your-vitals-as-you-game/ in 4 pages.

"Wearable Music Trainer Looks Like a Viral attempt to Fight Your Way to Fitness" by Natt Garun from Digital Trend on May 3, 2012, retrieved from: http://www.digitaltrends.com/mobile/wearable-music-trainer-looks-like-a-viral-attempt-to-fight-your-way-to-fitness/ in 3 pages.

"SteelSeries' Sentry tracks your eye movements in games" by Cyril Kowaliski, the Tech Report on Jun. 8, 2014, retrieved from: http://techreport.com/news/26596/steelseries-sentry-tracks-your-eye-movements-in-games in 1 page.

"Vibraudio Pose: An Investigation of Non-Visual Feedback Roles for Body Controlled Video Games" by Emiko Charbonneau et al., Sandbox 2010, Los Angeles, CA Jul. 28-29, 2010, retrieved from: http://www.eecs.ucf.edu/~jjl/pubs/p79-charbonneau.pdf in 6 pages.

The Partial Supplementary European Search Report dated Oct. 10, 2018, 17 pages, for the corresponding European Patent Application No. 15909380.6.

Wikipedia, "Head-Mounted Display" found at https://en.wikipedia.org/w/idex.php?title=Head-mounted_display&oldid=691070681, which is an old revision edited by Ajerimex (talk | contribs) on Nov. 17, 2015 in 9 pages.

Office Action (including English Translation) dated Jan. 31, 2020, for the corresponding Taiwanese Application No. 105135524 in 15 total pages.

\* cited by examiner

WEARABLE DEVICES, METHODS FOR CONTROLLING A WEARABLE DEVICE, AND COMPUTER-READABLE MEDIA

TECHNICAL FIELD

Various embodiments generally relate to wearable devices, methods for controlling a wearable device, and computer-readable media.

BACKGROUND

A user/gamer may have to open software (for example Razer Synapse) in order to view his statistics and heat maps, for example related to a computer game. This can be particularly inconvenient while he is in the midst of an intense activity such as gaming.

SUMMARY OF THE INVENTION

According to various embodiments, a wearable device may be provided. The wearable device may include: a determination circuit configured to determine data related to a gaming action performed on a computer to which the wearable device is external; and a feedback circuit configured to provide feedback to a user based on the determined data.

According to various embodiments, a method for controlling a wearable device may be provided. The method may include: determining data related to a gaming action performed on a computer to which the wearable device is external; and providing feedback to a user based on the determined data.

According to various embodiments, a computer-readable medium may be provided. The computer-readable medium may include instructions which, when executed by a computer, make the computer perform a method for controlling a wearable device. The method may include: determining data related to a gaming action performed on a computer to which the wearable device is external; and providing feedback to a user based on the determined data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1A:
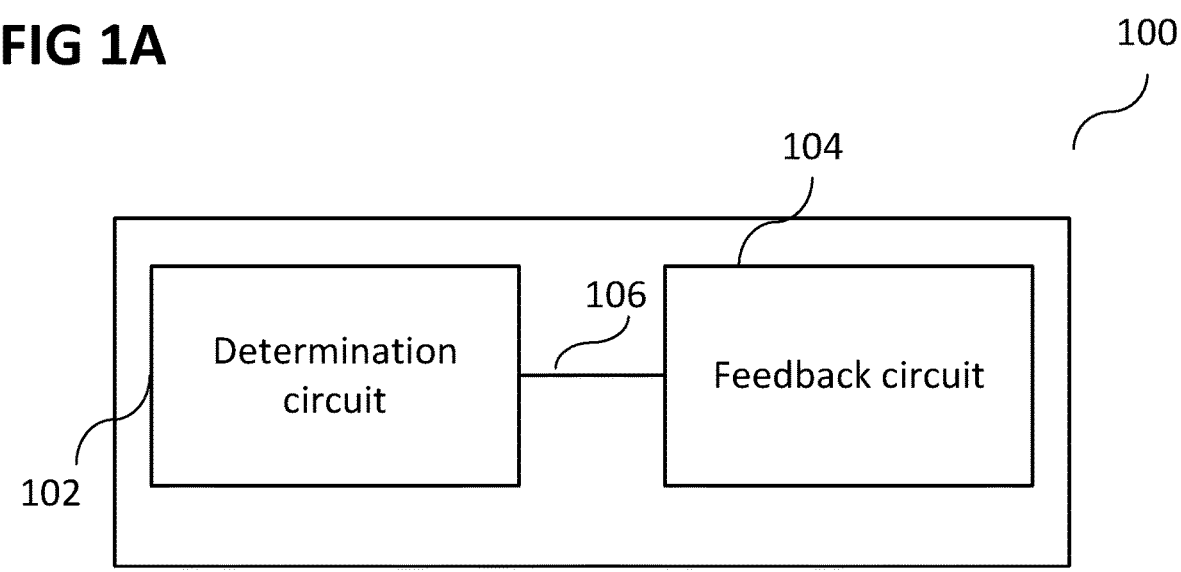
FIG. 1A and FIG. 1B show wearable devices according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the wearable device as described in this description may include a memory which is for example used in the processing carried out in the wearable device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

A user/gamer may have to open software (for example Razer Synapse) in order to view his statistics and heat maps, for example related to a computer game. This can be particularly inconvenient while he is in the midst of an intense activity such as gaming.

According to various embodiments, if the user is wearing a wearable device, specific important feedback such as gaming performance statistics may be visible to the user/gamer on his wearable device, leading the gamer to step up his performance.

According to various embodiments, in-game statistic feedback may be provided on a wearable device.

FIG. 1A shows a wearable device 100 according to various embodiments. The wearable device 100 may include a determination circuit 102 configured to determine data related to a gaming action performed on a computer to which the wearable device 100 is external. The wearable device 100 may further include a feedback circuit 104 configured to provide feedback to a user based on the determined data. The determination circuit 102 and the feedback circuit 104 may be coupled with each other, like indicated by line 106, for example electrically coupled, for example using a line or a cable, and/or mechanically coupled.

In other words, a wearable device may provide information related to a game played by a user on another device to the user.

According to various embodiments, the determination circuit 102 may be configured to receive the data.

According to various embodiments, the determination circuit 102 may be configured to receive the data from the computer.

According to various embodiments, the data may include or may be information of actions per minute (APM) taken by a user of the wearable device.

According to various embodiments, the feedback circuit 102 may include a light source configured to provide the feedback.

According to various embodiments, the feedback circuit 102 may include a mechanical actuator configured to provide the feedback.

According to various embodiments, the determination circuit 102 may be configured to determine the data from the computer.

According to various embodiments, the determination circuit 102 may be configured to determine the data from a server to which the computer is connected.

Figure 1B:
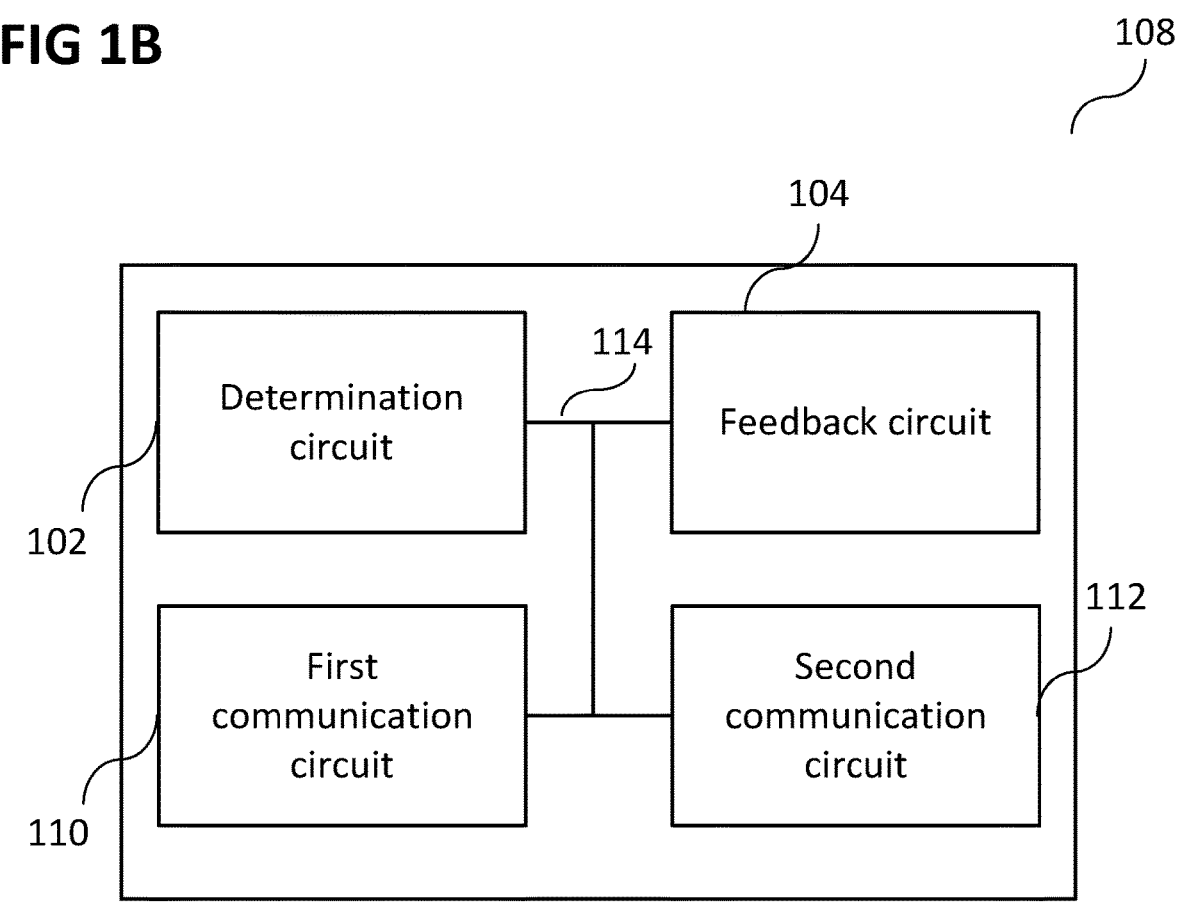

FIG. 1B shows a wearable device 108 according to various embodiments. The wearable device 108 may, similar to the wearable device 100 of FIG. 1A, include a determination circuit 102 configured to determine data related to a gaming action performed on a computer to which the wearable device 100 is external. The wearable device 108 may, similar to the wearable device 100 of FIG. 1A, further include a feedback circuit 104 configured to provide feedback to a user based on the determined data. The wearable device 108 may further include a first communication circuit 110, like will be described in more detail below. The wearable device 108 may further include a second communication circuit 112, like will be described in more detail below. The determination circuit 102, the feedback circuit 104, the first communication circuit 110, and the second communication circuit 112 may be coupled with each other, like indicated by lines 114, for example electrically coupled, for example using a line or a cable, and/or mechanically coupled.

According to various embodiments, the first communication circuit 110 may be configured to download configuration data from a server. According to various embodiments, the second communication circuit 112 may be configured to communicate with a peripheral device, so that the peripheral device gets configured according to the configuration data.

According to various embodiments, the first communication circuit 110 and the second communication circuit 112 may be a combined communication circuit.

According to various embodiments, the second communication circuit 112 may be configured to authenticate the peripheral device.

According to various embodiments, the configuration data may be specific to a computer game provided on a computer to which the peripheral device is connected.

According to various embodiments, the configuration data may be specific to the peripheral device.

Figure 1C:
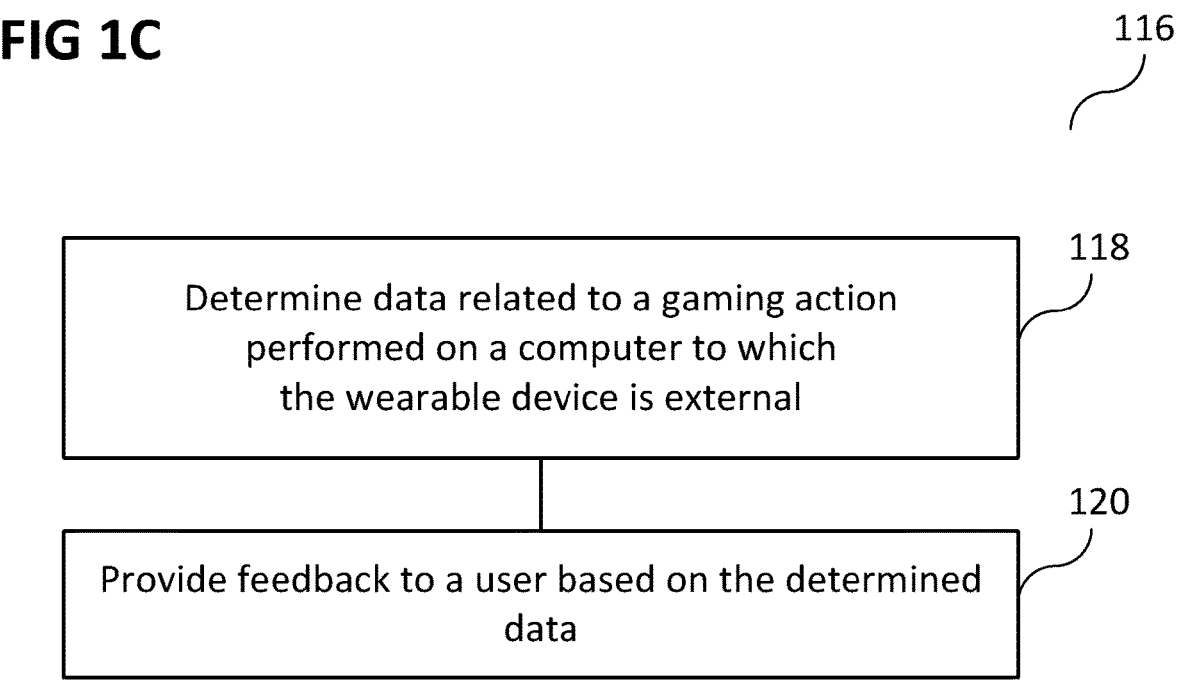
FIG. 1C shows a flow diagram illustrating a method for controlling a wearable device according to various embodiments.

FIG. 1C shows a flow diagram 116 illustrating a method for controlling a wearable device according to various embodiments. In 118, data related to a gaming action performed on a computer to which the wearable device is external may be determined. In 120, feedback may be provided to a user based on the determined data.

According to various embodiments, determining the data may include or may be receiving the data.

According to various embodiments, determining the data may include or may be receiving the data from the computer.

According to various embodiments, the data may include or may be information of actions per minute taken by a user of the wearable device.

According to various embodiments, the feedback may be provided using a light source.

According to various embodiments, the feedback may be provided using a mechanical actuator.

According to various embodiments, the data may be determined from the computer.

According to various embodiments, the data may be determined from a server to which the computer is connected.

According to various embodiments, the method may further include: downloading configuration data from a server; and communicating with a peripheral device, so that the peripheral device gets configured according to the configuration data.

According to various embodiments, the downloading and the communication may be performed by a combined communication circuit.

According to various embodiments, the method may further include authenticating the peripheral device.

According to various embodiments, the configuration data may be specific to a computer game provided on a computer to which the peripheral device is connected.

According to various embodiments, the configuration data may be specific to the peripheral device.

According to various embodiments, a (for example non-transitory) computer-readable medium may be provided and may include instructions which, when executed by a computer, make the computer perform a method for controlling a wearable device. The method may include: determining data related to a gaming action performed on a computer to which the wearable device is external; and providing feedback to a user based on the determined data.

According to various embodiments, determining the data may include or may be receiving the data.

According to various embodiments, determining the data may include or may be receiving the data from the computer.

According to various embodiments, the data may include or may be information of actions per minute taken by a user of the wearable device.

According to various embodiments, the feedback may be provided using a light source.

According to various embodiments, the feedback may be provided using a mechanical actuator.

According to various embodiments, the data may be determined from the computer.

According to various embodiments, the data may be determined from a server to which the computer is connected.

According to various embodiments, the method may further include: downloading configuration data from a server; and communicating with a peripheral device, so that the peripheral device gets configured according to the configuration data.

According to various embodiments, the downloading and the communication may be performed by a combined communication circuit.

According to various embodiments, the method may further include authenticating the peripheral device.

According to various embodiments, the configuration data may be specific to a computer game provided on a computer to which the peripheral device is connected.

According to various embodiments, the configuration data may be specific to the peripheral device.

According to various embodiments, devices and methods may be provided for delivering real-time feedback to the user on a wearable device. The feedback may be in the form of statistics that are derived from a specific software that is loaded onto a portable/fixed processing system. For example, Razer currently has a software program known as Razer Synapse, the purpose of which stores input devices (such as mice and keyboard) profiles on the cloud so that the profiles can be used on any Razer input device anytime anywhere once it is connected to the network. In addition, Razer Synapse collects data such as actions per minute (APM) when used in a game, wherein APM may for example be the number of clicks of a mouse button per minute as a measure of gaming performance. It also may collect other data on the keyboard performance. All these may be displayed to the user in the form of statistics and heat maps in Razer Synapse. According to various embodiments, either real-time feedback or feedback derived from Razer Synapse may be provided to the user such as through visual or vibrating means through the wearable device so that the user can see or feel first hand his/her actual performance without having to open the software on the display screen.

According to various embodiments, specific feedback may be delivered to the user from stats (in other words: statistics) and heatmaps via a wearable device. As specific user information collected by Synapse such as APM (actions per minute), and mouse movement is sent to a server (for example Razer's data servers), this information may then be sent down to the wearable device through a connected utility app, which may then activate the wearable device (for example band, for example wristband) in specific ways.

Various devices and methods relate to statistics feedback, wearable devices, visual LEDs (light emitting diodes), specify OLED (organic LED) screens (which may be a light source, and which may forms legible text) or vibrations.

According to various embodiments, a wearable device may be connected to a gaming device (for example a PC (personal computer), console, mobile phone, tablet, etc).

According to various embodiments, a gaming device may be provided that is able to detect user's live gaming statistics such as the following:

actions per minute (APM);

maintaining Target APM;

interval timing (for example Queen Injects (which may be a StarCraft 2 command in which an in-game unit may spawn more in-game units; however, this command cannot be used consecutively, as that would render the command too powerful; instead, there may be a cool down time allotted before the command can be used again) and/or Spell Cool Downs (which may be a game mechanic in which a spell cannot be used again consecutively right after it has been previously executed by the player, until an allotted time has passed; a notification may be set such that when the allotted time has passed, the player may be alerted to when they may be able to execute said spell again; the wearable device according to various embodiments may vibrate as part of that alert notification); and/or According to various embodiments, eye tracking may be provided.

According to various embodiments, a player may desire to refer to an in-game mini-map in order to ascertain specific information such as their own location, that of the enemy, and so on. According to various embodiments, an alert may be set up to remind the player to avert their gaze to the mini-map every so often in order to receive the appropriate information for game success. In other words, an alert may be triggered if the user has not been looking at the mini-map less than X times per minute (wherein X may be a predetermined number).

According to various embodiments, a wearable device may not be considered a Haptic immersive device. It will be understood that a Haptics immersive device is one whose sole purpose is to provide tactile feedback to a user, prioritizing the sensation from the feedback over anything else.

From a user experience standpoint, according to various embodiments, the feedback such as APM levels may be communicated to the user via the wearable device's lighting and vibration features. This may provide the user the advantage of being able to know his APM performance on-the-fly while gaming, for example his band is flashing red to denote a specific range of APM and knows that he needs to increase his APM and get it into the "green". The band may also explicitly read out text that states a range of APM, and the user may thus know that he needs to increase his APM to get it into the "green". The user may also be alerted to specific performance parameters such as hitting screen corners (as detectable by stats and heatmaps) by way of a band vibration. This feedback may allow the user the advantage of making sure to keep his mouse centered quickly, which may be most vital in first person shooters.

According to various embodiments, stats and heat information may be collected in the "cloud", for example by way of Razer servers. For example, the Razer stats and heatmaps servers may be connected to the wearable device's utility app by way of an open SDK (software development kit) and APIs (application programming interfaces).

According to various embodiments, the wearable device's utility app may be programmed to receive this data and allow user to customize responses on the wearable device by way of the Settings in the utility app. For instance, just as users are able to set the wearable device's LED colors to flash in correspondence to specific notification types (for example calls, texts, or app alerts), the wearable device lighting patterns may be set to match different ranges of APM i.e. 50-60 actions per minute. According to various embodiments, a wearable device may be provided with an OLED screen, and the OLED screen may be configured to display text referring to the different ranges of APM.

According to various embodiments, the utility app may be set to gaming mode to ensure the wearable device turns on "Do Not Disturb" mode (for example for no incoming notifications) and switches over to APM feedback mode. According to various embodiments, a user may be able to set the utility app for lights flashing within a specific time period (for example every minute, or every 5 minutes).

According to various embodiments, a gaming Profile and storage manager may be provided on a wearable device.

Figure 2A:
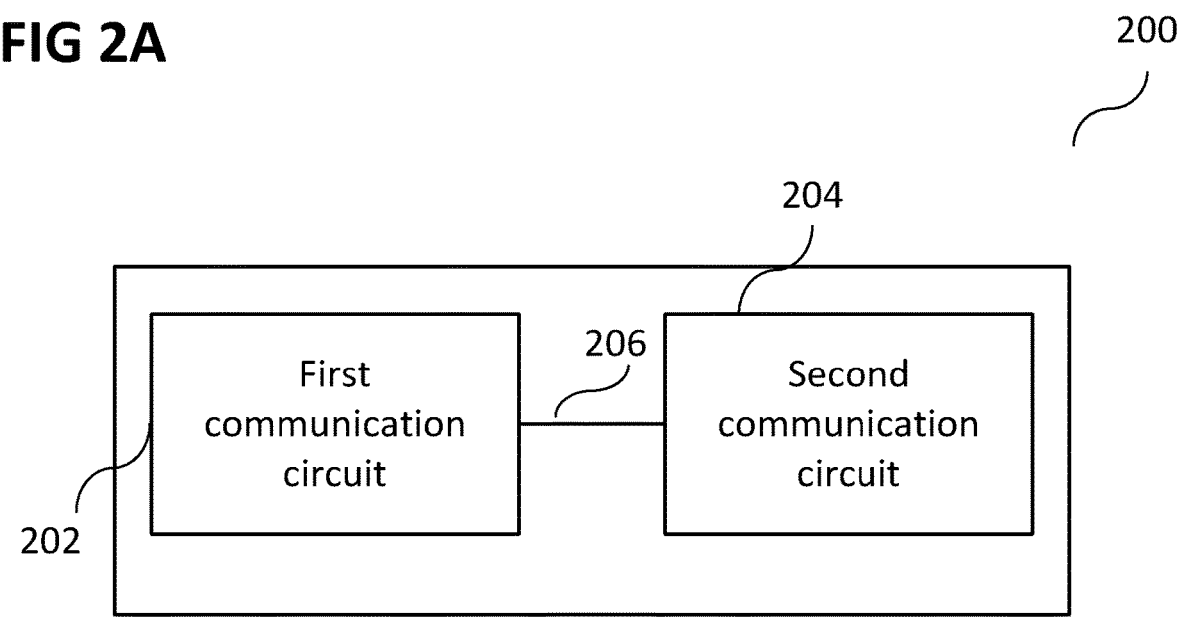
FIG. 2A shows a wearable device according to various embodiments.

FIG. 2A shows a wearable device 200 according to various embodiments. The wearable device 200 may include a first communication circuit 202 configured to download configuration data from a server. The wearable device 200 may further include a second communication circuit 204 configured to communicate with a peripheral device, so that the peripheral device gets configured according to the configuration data. The first communication circuit 202 and the second communication circuit 204 may be coupled with each other, like indicated by line 206, for example electrically coupled, for example using a line or a cable, and/or mechanically coupled.

In other words, a wearable device may provide configuration data from a server to a peripheral device.

According to various embodiments, the first communication circuit 202 and the second communication circuit 204 may be a combined communication circuit.

According to various embodiments, the second communication circuit 204 may be configured to authenticate the peripheral device.

According to various embodiments, the configuration data may be specific to a computer game provided on a computer to which the peripheral device is connected.

According to various embodiments, the configuration data may be specific to the peripheral device.

Figure 2B:
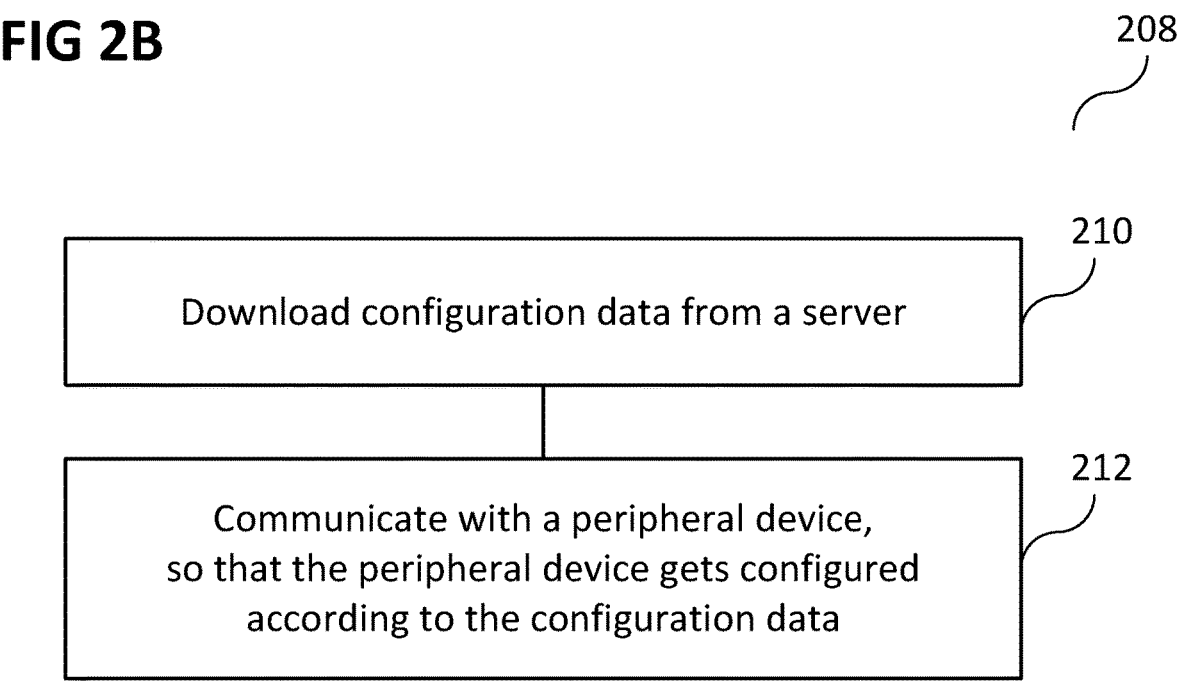
FIG. 2B shows a flow diagram illustrating a method for controlling a wearable device according to various embodiments.

FIG. 2B shows a flow diagram 208 illustrating a method for controlling a wearable device according to various embodiments. In 210, configuration data may be downloaded from a server. In 212, communicating with a peripheral device may be performed, so that the peripheral device gets configured according to the configuration data.

According to various embodiments, the downloading and the communication may be performed by a combined communication circuit.

According to various embodiments, the method may further include authenticating the peripheral device.

According to various embodiments, the configuration data may be specific to a computer game provided on a computer to which the peripheral device is connected.

According to various embodiments, the configuration data may be specific to the peripheral device.

According to various embodiments, a (for example non-transitory) computer-readable medium may be provided and may include instructions which, when executed by a computer, make the computer perform a method for controlling a wearable device. The method may include: downloading configuration data from a server; and communicating with a peripheral device, so that the peripheral device gets configured according to the configuration data.

According to various embodiments, the downloading and the communication may be performed by a combined communication circuit.

According to various embodiments, the method may further include authenticating the peripheral device.

According to various embodiments, the configuration data may be specific to a computer game provided on a computer to which the peripheral device is connected.

According to various embodiments, the configuration data may be specific to the peripheral device.

According to various embodiments, devices and methods may be provided for transferring saved user profiles that are stored on a cloud server on (in other words: to) a default configuration peripheral input device through a wearable device. The user profiles are peripheral input device's settings such as keyboard or mice macro shortcuts or lighting schemes, etc that are saved on a software (for example the Razer Synapse). Razer Synapse may allow a user to save his profile settings on the cloud so that the user profile settings can be used on any Razer peripheral input device. According to various embodiments, the wearable device may act as a conduit for transferring saved user-profile configurations from Synapse servers direct to a peripheral input device (e.g., keyboard, mice, gaming controller) without requiring Synapse to be installed on a PC. Instead, a communication chip may be installed within the peripheral input device that remains dormant until coming into close contact with a wearable device (for example using the Nabu or Nabu X's Band-to-Band communication feature). This may then communicate with the Nabu or Nabu X, which may make a call back to the server through a utility app (application), to pull user-saved profile configurations specific to the peripheral input device under hand. Then, the changes may be made within the peripheral input device by itself for immediate use.

Various embodiments relate to profile settings and wearable devices.

By allowing a wearable device (for example a smart wristband, for example the Nabu or Nabu X) to directly instigate "change" in customizable features on a peripheral input device, this may allow the user to begin playing games immediately, and not have to go through the hassle of downloading a software (e.g. Synapse) on the gaming PC connected to the peripheral. This may be especially useful at tournament venues, where gaming machines are set up by external parties, with brand new peripherals laid out in default configurations.

According to various embodiments, without requiring a network connection, a wearable device may be able to authenticate at least one peripheral input device in close proximity.

According to various embodiments, a peripheral input device may be connected to a personal computer and to a network. This may help prevent theft of peripherals. Local Storage on the peripheral may boost storage from peripherals. A wearable device may be a conduit linking two or more peripheral input devices together via close wireless proximity, while all peripherals are connected to the same personal computer.

According to various embodiments, in use, a user may first synchronize their wearable device to the synapse account, both of which use a Razer ID. Once this is done, the wearable device may pull specific user-saved peripheral data associated to the Razer ID from Razer Synapse servers, by way of open SDK and APIs. This user-saved peripheral data may be stored and transferred as "tags" down through the utility app from the cloud to the wearable device.

According to various embodiments, the peripheral input device in question may be installed with a communication chip that may read these "tags" as pushed by the wearable device in "close proximity", through its Band-to-Band communication platform. The peripheral input device, already "powered" through USB (universal serial bus) connection to a computer, may be able make the change internally, to update to the latest configurations as set by the user last, via Synapse.

The following examples pertain to further embodiments.

Example 1 is a wearable device comprising: a determination circuit configured to determine data related to a gaming action performed on a computer to which the wearable device is external; and a feedback circuit configured to provide feedback to a user based on the determined data.

In example 2, the subject-matter of example 1 can optionally include that the determination circuit is configured to receive the data.

In example 3, the subject-matter of any one of examples 1 to 2 can optionally include that the determination circuit is configured to receive the data from the computer.

In example 4, the subject-matter of any one of examples 1 to 3 can optionally include that the data comprises information of actions per minute taken by a user of the wearable device.

In example 5, the subject-matter of any one of examples 1 to 4 can optionally include that the feedback circuit comprises a light source configured to provide the feedback.

In example 6, the subject-matter of any one of examples 1 to 5 can optionally include that the feedback circuit comprises a mechanical actuator configured to provide the feedback.

In example 7, the subject-matter of any one of examples 1 to 6 can optionally include that the determination circuit is configured to determine the data from the computer.

In example 8, the subject-matter of any one of examples 1 to 7 can optionally include that the determination circuit is configured to determine the data from a server to which the computer is connected.

In example 9, the subject-matter of any one of examples 1 to 8 can optionally include: a first communication circuit configured to download configuration data from a server; and a second communication circuit configured to communicate with a peripheral device, so that the peripheral device gets configured according to the configuration data.

In example 10, the subject-matter of example 9 can optionally include that the first communication circuit and the second communication circuit are a combined communication circuit.

In example 11, the subject-matter of any one of examples 9 to 10 can optionally include that the second communication circuit is configured to authenticate the peripheral device.

In example 12, the subject-matter of any one of examples 9 to 11 can optionally include that the configuration data is specific to a computer game provided on a computer to which the peripheral device is connected.

In example 13, the subject-matter of any one of examples 9 to 12 can optionally include that the configuration data is specific to the peripheral device.

Example 14 is a method for controlling a wearable device, the method comprising: determining data related to a gaming action performed on a computer to which the wearable device is external; and providing feedback to a user based on the determined data.

In example 15, the subject-matter of example 14 can optionally include that determining the data comprises receiving the data.

In example 16, the subject-matter of any one of examples 14 to 15 can optionally include that determining the data comprises receiving the data from the computer.

In example 17, the subject-matter of any one of examples 14 to 16 can optionally include that the data comprises information of actions per minute taken by a user of the wearable device.

In example 18, the subject-matter of any one of examples 14 to 17 can optionally include that the feedback is provided using a light source.

In example 19, the subject-matter of any one of examples 14 to 18 can optionally include that the feedback is provided using a mechanical actuator.

In example 20, the subject-matter of any one of examples 14 to 19 can optionally include that the data is determined from the computer.

In example 21, the subject-matter of any one of examples 14 to 20 can optionally include that the data is determined from a server to which the computer is connected.

In example 22, the subject-matter of any one of examples 14 to 21 can optionally include: downloading configuration data from a server; and communicating with a peripheral device, so that the peripheral device gets configured according to the configuration data.

In example 23, the subject-matter of example 22 can optionally include that the downloading and the communication are performed by a combined communication circuit.

In example 24, the subject-matter of any one of examples 22 to 23 can optionally include authenticating the peripheral device.

In example 25, the subject-matter of any one of examples 22 to 24 can optionally include that the configuration data is specific to a computer game provided on a computer to which the peripheral device is connected.

In example 26, the subject-matter of any one of examples 22 to 25 can optionally include that the configuration data is specific to the peripheral device.

Example 27 is a computer-readable medium comprising instructions which, when executed by a computer, make the computer perform a method for controlling a wearable device, the method comprising: determining data related to a gaming action performed on a computer to which the wearable device is external; and providing feedback to a user based on the determined data.

In example 28, the subject-matter of example 27 can optionally include that determining the data comprises receiving the data.

In example 29, the subject-matter of any one of examples 27 to 28 can optionally include that determining the data comprises receiving the data from the computer.

In example 30, the subject-matter of any one of examples 27 to 29 can optionally include that the data comprises information of actions per minute taken by a user of the wearable device.

In example 31, the subject-matter of any one of examples 27 to 30 can optionally include that the feedback is provided using a light source.

In example 32, the subject-matter of any one of examples 27 to 31 can optionally include that the feedback is provided using a mechanical actuator.

In example 33, the subject-matter of any one of examples 27 to 32 can optionally include that the data is determined from the computer.

In example 34, the subject-matter of any one of examples 27 to 33 can optionally include that the data is determined from a server to which the computer is connected.

In example 35, the subject-matter of any one of examples 27 to 34 can optionally include that the method further comprises: downloading configuration data from a server;

and communicating with a peripheral device, so that the peripheral device gets configured according to the configuration data.

In example 36, the subject-matter of example 35 can optionally include that the downloading and the communication are performed by a combined communication circuit.

In example 37, the subject-matter of any one of examples 35 to 36 can optionally include that the method further comprises authenticating the peripheral device.

In example 38, the subject-matter of any one of examples 35 to 37 can optionally include that the configuration data is specific to a computer game provided on a computer to which the peripheral device is connected.

In example 39, the subject-matter of any one of examples 35 to 38 can optionally include that the configuration data is specific to the peripheral device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wearable device comprising:
 a determination circuit configured to determine data related to a gaming action performed on a computer to which the wearable device is external; and
 a feedback circuit configured to provide feedback to a user based on the determined data, wherein the feedback comprises visual information, statistics, alerts or notifications to improve game performance of the user of the wearable device.

2. The wearable device of claim 1,
 wherein the determination circuit is configured to receive the data.

3. The wearable device of claim 1,
 wherein the data comprises information of actions per minute taken by a user of the wearable device and the information of actions per minute is provided as feedback to the user.

4. The wearable device of claim 1,
 wherein the feedback circuit comprises a light source configured to provide the feedback, wherein the light source is an LED.

5. The wearable device of claim 1,
 wherein the determination circuit is configured to determine the data from a server to which the computer is connected.

6. The wearable device of claim 1, further comprising:
 a first communication circuit configured to download configuration data from a server; and
 a second communication circuit configured to communicate with a peripheral device, so that the peripheral device gets configured according to the configuration data.

7. The wearable device of claim 6,
 wherein the first communication circuit and the second communication circuit are a combined communication circuit.

8. The wearable device of claim 6,
 wherein the second communication circuit is configured to authenticate the peripheral device.

9. The wearable device of claim 6,
 wherein the configuration data is specific to at least one of the peripheral device or a computer game provided on a computer to which the peripheral device is connected.

10. A method for controlling a wearable device, the method comprising:
 determining data related to a gaming action performed on a computer to which the wearable device is external; and
 providing feedback to a user based on the determined data, wherein the feedback comprises visual information, statistics, alerts or notifications to improve game performance of the user of the wearable device.

11. The method of claim 10,
 wherein determining the data comprises receiving the data.

12. The method of claim 10,
 wherein the data comprises information of actions per minute taken by a user of the wearable device and the information of actions per minute is provided as feedback to the user.

13. The method of claim 10,
 wherein the feedback is provided using a light source, wherein the light source is an LED.

14. The method of claim 10,
 wherein the data is determined from a server to which the computer is connected.

15. The method of claim 10, further comprising:
 downloading configuration data from a server; and
 communicating with a peripheral device, so that the peripheral device gets configured according to the configuration data.

16. The method of claim 15,
 wherein the downloading and the communication are performed by a combined communication circuit.

17. The method of claim 15, further comprising:
 authenticating the peripheral device.

18. The method of claim 15,
 wherein the configuration data is specific to at least one of the peripheral device or a computer game provided on a computer to which the peripheral device is connected.

19. A non-transitory computer-readable medium comprising instructions which, when executed by a computer, make the computer perform a method for controlling a wearable device, the method comprising:
 determining data related to a gaming action performed on a computer to which the wearable device is external; and
 providing feedback to a user based on the determined data, wherein the feedback comprises visual information, statistics, alerts or notifications to improve game performance of the user of the wearable device.

20. The non-transitory computer-readable medium of claim 19,
 wherein the data comprises information of actions per minute taken by a user of the wearable device and the information of actions per minute is provided as feedback to the user.

* * * * *